3,649,586
"FLEMISHING" METHOD AND ARTICLES
Helen E. Trexel, Wilmington, Del., assignor to Da-Kor Products, Inc.
Continuation-in-part of applications Ser. No. 457,179, May 19, 1965, Ser. No. 698,401, Jan. 17, 1968, and Ser. No. 827,132, May 23, 1969. This application May 5, 1970, Ser. No. 34,769
Int. Cl. C08f 45/04
U.S. Cl. 260—33.6                                                   1 Claim

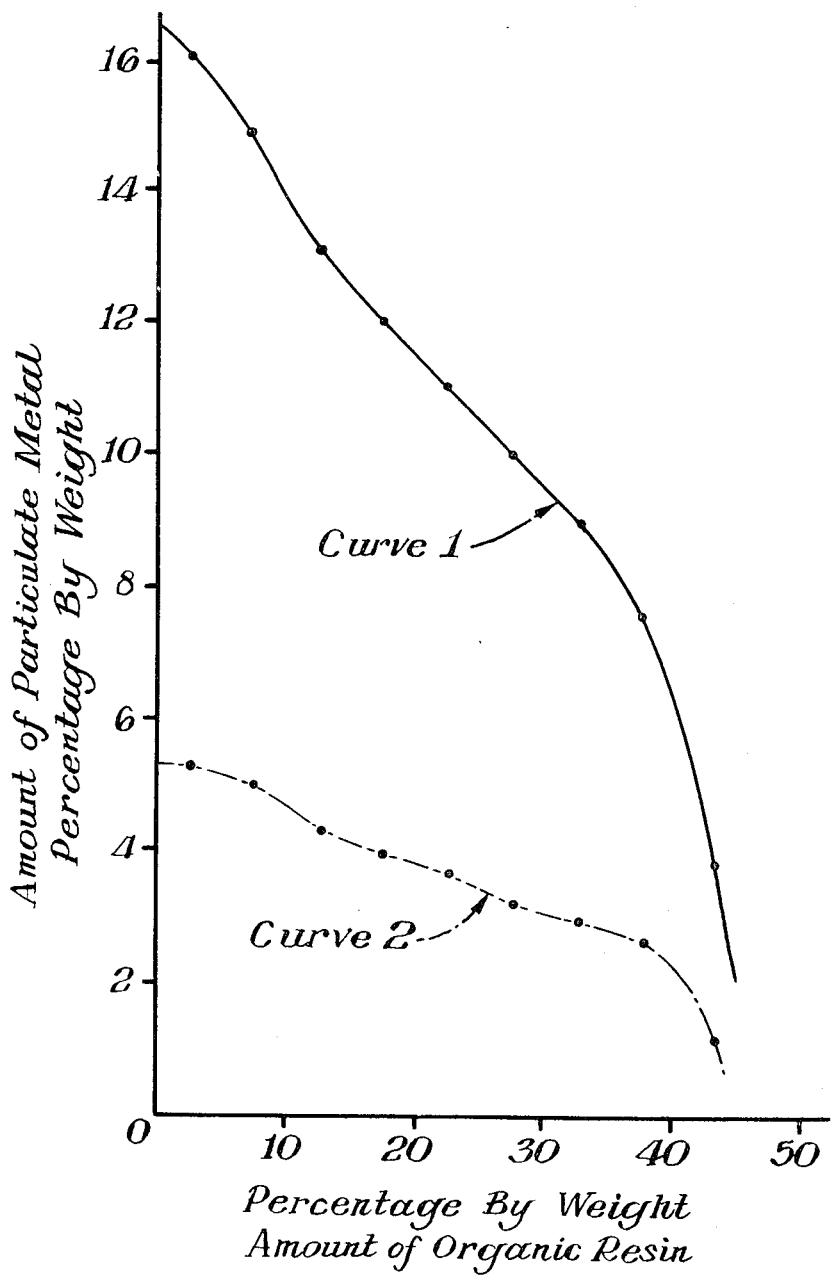

ABSTRACT OF THE DISCLOSURE

Herein are disclosed improved articles of manufacture and the method for making same, involving the imparting of a pleasing "flemish" appearance to decorative articles of manufacture having a nonporous surface including artificial flowers, fruit, vegetables and the like by applying to the surface thereof a formulation comprising a powdered metal dispersed in a solution of a solid, resinous or oleaginous binder in a volatile solvent. A pigment also may be included to impart a desired color shade.

The articles of this invention are useful as decorative displays such as centerpieces, bouquets and the like and the composition is useful for imparting an antiqued or flemished appearance to polyethylene flowers, fruits, vegetables and the like.

CROSS-REFERENCE TO RELATED APPLICATION

This application is a continuation-in-part of my copending applications, Ser. No. 457,179, filed May 19, 1965, now abandoned, Ser. No. 698,401, filed Jan. 17, 1968, now abandoned, and Ser. No. 827,132, filed May 23, 1969, now abandoned.

BACKROUND OF THE INVENTION

(a) Field of the invention

This invention relates to a composition for imparting an "antiqued" or "flemished" appearance on decorative objects such as arificial flowers, fruits, vegetables and the like.

(b) Description of the prior art

It is known in the art that attractive aged or antique appearance may be applied as a decorative finish to objects known as "flemish" having a nonporous surface such as artificial flowers, fruits, and vegetables. The processes for imparting the finish is tedious requiring many dipping steps and a drying step wherein the object which is coated is kept in an inverted position.

Decorative objects made from nonporous plastic materials made of waxes and hydrocarbon polymers which are also known as other plastics such as polystrene, polyvinyl chloride and the like and other nonporous substances such as glass and porcelain, in the form of fruits, flowers, vegetables, vases, trays, frames, centerpieces, and the like, are commonplace. However, the appearance of such objects as conventionally made and sold quite often leaves much to be desired. One common defect is that such objects frequently look overly "new," and hence artificial. The appearance of these objects can be improved by imparting thereto an "antiqued" or "flemished" appearance. Accordingly, a principal object of this invention is to provide a novel method for giving an "antiqued" or "flemished" appearance having an aged or "antique" appearance to a nonporous substrate. A further object of this invention is to provide novel and improved articles of manufacture having this "flemish" or "antiqued" appearance such as decorative objects such as artificial flowers, fruits and vegetables, vases, trays, frames and the like, which are improved in appearance. Yet another object of this invention is to provide a simple process useful for improving the appearance of artificial flowers, fruits, vegetables and the like, as aforesaid by imparting thereto an antiqued or flemished appearance. Still another object of this invention is to provide a composition which is useful to impart the "flemish" or "antiqued" appearance to a nonporous substrate herein described.

SUMMARY OF THE INVENTION

This invention is directed to a method for imparting an antiqued appearance to a nonporous substrate comprising polyethylene, polypropylene, polystrene, polyvinyl chloride, glass or porcelain, which comprises:

(a) Applying to the surface of the substrate a mixture which comprises:

(1) 0.5 to 45%, by weight, organic resin selected from the group consisting of hydrocarbon resins, terpene resins, pentaerythritol resins, ester gum resins, alkyd resins, poly(methyl acrylate), poly(methyl methacrylate), animal drying oils, vegetable drying oils and a mixture thereof having a molecular weight of from about 1000 to 10,000;

(2) 0.1 to 16%, by weight, of a particulate metal, and (3) 39 to 99.4%, by weight, of an organic solvent or mixture thereof wherein said organic solvent or up to 50%, by weight, of a mixture thereof is an organic solvent having a relative evaporation rate compared to toluene of 0.03 to 6.0.

This invention is also directed to a metal dispersion useful for coating a predominately nonporous substrate with a flemish-like, antique finish, comprising, (a) 0.5 to 45%, by weight, of an organic resin selected from the group consisting of hydrocarbon resins, terpene resins, pentaerythritol resins, ester gum resins, alkyd resins, poly (methyl acrylate), poly(methyl methacrylate), animal drying oils, vegetable drying oils and a mixture thereof having a molecular weight of from about 1000 to 10,000, or higher, (b) 0.1–16%, by weight, of a particulate metal;

(c) 0 to 10%, by weight, of a coloring agent comprising a hydrocarbon soluble dye or pigment; and (d) 29 to 99.4%, by weight, of an organic solvent or mixture thereof having a relative evaporation rate compared to toluene of 0.03 to 6.0.

This invention is further directed to an article of manufacture comprising a plastic artificial flower, fruit or vegetable having a thin flemish, antique surface coating produced by coating said flower, fruit or vegetable with a dispersion described above and herein.

The improved articles of manufacture of this invention, for example, artificial fruits, flowers and vegetables made of hydrocarbon polymers such as polyethylene and polypropylene can be assembled into useful and decorative displays such as in the form of bouquets, centerpieces, wall decorations and the like.

DESCRIPTION OF THE PREFERRED EMBODIMENT

The drawing is a graph of the interrelationship of amount of resin and particulate metal making up the composition of this invention. Curve 1 of the graph shows the relationship for dispersion containing metal powders other than aluminum. Curve 2 shows the relationship for dispersions containing aluminum. The remainder of the material making up the dispersion is a dye or pigment and solvent. It has been found that the appearance of articles of manufacture having a nonporous surface can be substantially improved by applying thereto a composition of matter of this invention comprising a mixture of a particulate metal dispersed or suspended in a solution of an organic resinous material in an organic solvent. The improvement obtained to the appearance consists of "flemish" or "antique" appearance being imparted to the article of manufacture.

By "flemish" or "antique" appearance, it is meant the effect pleasing to the human eye achived by the creation of a flossy surface having decorative metallized portions predominately at the edges of the object and on ridges, high or raised portions, or on irregular or rough areas of said surface.

An effect somewhat similar to that obtained by my invention can be achieved by a multiple process wherein the object is repeated and alternately dipped in a solution of a resinous material in an organic solvent and in a particulate metal and then allowing the object so treated to drip in an inverted position. However, the articles of manufacture of this invention are unexpectedly improved and more pleasing in appearance compared to the objects produced by the multiple dipping process because the transition from the metallized coated areas to the non-metallized coated areas is gradual. The multiple dipping process produces articles having very little if any graduation between the metallized areas and the nonmetallized areas.

The process of this invention for coating a nonporous substrate to impart a "flemish" appearance comprises applying by painting, dipping, spraying and the like to the substrate a dispersion of a particulate metal dispersed in a solution of resinous material dissolved in an organic solvent. Additionally, the dispersions can contain in addition to the particulate metal a pigment or dye or a mixture thereof suspended or dispersed, including molecularly dispersed, in a solution of a resinous material dissolved in addition to the particulate metal a pigment or dye or a mixture thereof can be incorporated into the formulation to impart a desired color or shade to the final coating applied to the substrate.

Preferably, the dispersion is applied to a nonporous substrate having a moderately smooth surface, i.e., a surface having small ridges, rough areas or high spots.

After application of the dispersion of this invention the solvent is allowed to dry or evaporate from the coating on the article of manufacture in any position including an upright position by allowing the article to stand at room temperature. The resinous substance or binder moiety of the dispersion slowly hardens as the solvent evaporates. For a period of time of about 5 to 20 minutes, the coating remains tacky. The particulate metal migrates to the edges of the article while the article is fluid; therefore, the "antiqued" effect is not a result of the evaporation of the solvent. The result obtained on drying is a thin glossy clear or translucent coating of the resinous material or binder on the surface of the coated article of manufacture with the particulate metal localized at the edges and at any ridges or high spots or rough areas on the surface of the article of manufacture.

It is believed that the gradual and predominate localization of the metal component of the dispersions to edges, raised and irregular areas, ridges and rough spots of a predominately smooth nonporous substrate is a result of the ratio of the particulate metal to solution of dispersion. When high ratio, i.e., dispersions commonly called paints, containing higher ratios of particulate metal to solution are used, the localization effect is not obtained. Use of compositions having a ratio of metal to resin on a substrate results in the entire surface of the substrate being coated with the particulate metal and the pleasing "flemish" or antique effect produced by my compositions is not obtained.

Particulate metals found suitable for use in practicing the present invention include particulate gold-bronze, aluminum, copper, gold, silver and mixtures and alloys thereof with each other and the like. The metals must be a powder, e.g., in a finely divided particulate form. The desirable shape and size of the metal particles used should be a combination which provides a reasonably uniform and easy dispersal of the metal particles throughout the formulation during preparation thereof and during the application the formulation to the nonporous substrate and for inclusion within the resulting thin coating on the surface of the object. Suitable metal powders are available commercially and are conveniently used. These include, for example, products such as "Venus" "Gold" Bronze Powders and "Venus" Aluminum Powders, available commercially from United States Bronze Powders, Incorporated, of Flemington, N.J.

Binders suitable for use in practicing the present invention include, for example, hydrocarbon resins such as those derived from petroleum, coumarone-indene resins, terpene resins, pentaterythritol resins, ester gum resins, alkyd resins, acrylic resins, animal and vegetable oils, and mixtures of any of the foregoing with each other or the like. Preferably, the binder is an organic resin at room temperature, and is thermoplastic. The use of thermoplastic hydrocarbon resins derived from petroleum is particularly preferred. Suitable resins of such type are commercially available and are conveniently used. They include, for example, the various products available commercially under the name, "Piccopale," and sold by Pennsylanvia Industrial Chemicals, Incorporated, of Clairton, Pa. "Piccopale" resin which is a synthetic, polyolefin type hydrocarbon resin produced from the deep cracking of petroleum, said resin having a softening point of 100° C., a specific gravity (25/25° C.) of 0.96–0.98, an acid number less than one and an iodine number (Wijs) of 195 and a molecular weight of 1400 as described in U.S. Pats. 3,247,142; 3,036,942; and 3,390,035. "Piccopale" hydrocarbon resins have the following properties:

| | |
|---|---|
| Color, coal tar scale | 2 |
| Color, gardner scale | II |
| Color, rosin scale | N |
| Refractive index | 1.53 |
| Specific gravity | 0.96–0.98 |
| Pounds per gallon | 8.01 |
| Gallons per pound | 0.1249 |
| Pounds per gallon, 70% solution mineral spirits | 7.67 |
| Specific heat | 0.45 |
| Ash content _____percent | Less than 0.1 |
| Acid number | Less than 1 |
| Saponification number | Less than 1 |
| Dielectric constants: | |
| 100 cycles | 2.33±0.05 |
| 10,000 cycles | 2.33±0.05 |
| 1 megacycle | 2.33±0.05 |
| 100 megacycles | 2.33±0.05 |
| Loss tangent: | |
| 100 cycles | 0.0003 |
| 10,000 cycles | 0.0003 |
| 1 megacycle | 0.0005 |
| 100 megacycles | 0.0008±0.0004 |

"Piccopale 100" which is a member of the Piccopale resins has been found to give excellent results in the invention. Piccopale 100 is the preferred resin in my formulation. "Piccopale 100" has the following properties:

| | |
|---|---|
| Melting point, ball-and-ring (ASTM) ° C | 100 |
| Bromine number (electrometric) | 36 |
| Molecular weight | 1400 |
| Iodine number (corrected) | 60 |
| Iodine number (Wijs method) | 145 |
| Flash point (C.O.C.) ° F | 510 |
| Fire point (C.O.C.) ° F | 575 |

Alkylated aromatic resins derived from petroleum also are satisfactory for use and suitable resins are available commercially from Pennsylvania Industrial Chemicals, incorporated, under the name, "Picco 600 Series Resin."

Drying oils of the animals or vegetable types also can be used as the binder.

Solvents which can be used in the practice of the present invention are those which will dissolve the resinous binder in desired concentrations. On the other hand it is convenient to use a solvent which when used in a formulation applied to a surface dries to a non-tacky coating in about 5 to 20 minutes. Suitable solvents include petroleum fractions, such as mineral spirits, aromatics, cyclohexane, heptanes, hexanes, naphtha, decalin, tetralin, mixtures of these and the like, and solvents obtained from the destructive distillation of wood, such as spirits of turpentine. Specifications for such solvents are well known and for petroleum or mineral spirits are set forth in The American Society of Testing Materials methods ASTM Standard Designation D–235–61, and for spirits of turpentine are set forth in ASTM Standard Designation D 13–65. Other common solvents such as, for example, commercial paint thinner, also can be used. Preferably the relative evaporation rate of the solvent compared to toluene (toluene= 1.00) is about 6.0 to 0.03 with the relative evaporation rate of about 4.5 to 0.06 being preferred and 1.8 to 0.06 being most preferred. The evaporation time for the various solvent can be determined using the method described in ASTM D 1901–67.

The relative evaporation rate of various solvents, compared to toluene, produced and sold by the American Mineral Spirits Company, a division of The Union Oil Company of California are:

Amsco hexane _____ 5.50
Amsco textile spirits _____ 4.40
Amsco lactol spirits _____ 1.80
Amsco heptane _____ 2.60
Amsco special naphtholite 663(4) _____ 0.47
Amsco mineral spirits 663(4) _____ 0.06
Amsco odorless mineral spirits _____ 0.03

Up to about 50%, by weight of the solvent can be a compound or mixture of compounds useful as propellant in aerosol cans. For example, the compound or compounds can be a low boiling fluorocarbon or hydrocarbon having a boiling point of −50 to 150° F., or a mixture of these compounds.

When desired to impart a particular color shade, a dye or pigment can be incorporated in the coating formulation. Such pigments can be any of those normally used in varnish stains, such as, for example, iron oxides, titanium dioxide, carbon black, burnt umber, Para red, Hansa yellows, phthalocyanine, and basic zinc potassium chromate, and also mixtures of these with each other or the like. Dyes useful include any of the well known azo dyes such as methyl orange, orange 11, Fast Scarlet G, and the like; triphenylmethane dyes; isatin dyes; anthraquinone dyes and quinonimine dyes.

On the basis of 100 parts by weight of the resinous or oleaginous binder, a satisfactory formulation can include from about 16 to 32 parts by weight of the powdered gold bronze or copper, 300 parts by weight of the solvent, and from about 0 to about 4 parts by weight of a dye or pigment. The dispersion of this invention useful for coating a predominately nonporous substrate with a "flemish"-like, "antique" finish comprises:

(a) 0.5 to 45%, by weight, of an organic resin as a binder;
(b) 0.1–16%, by weight, of a particulate metal;
(c) 0 to 10%, by weight, of a coloring agent comprising a dye or pigment; and
(d) 29 to 99.4%, by weight, of an organic solvent or a mixture thereof; with the provisos that dispersions contain 0.5 to 5%, by weight, of resin contain up to 16%, by weight, metal; dispersions containing 5 to 10%, by weight, resin contain up to 15%, by weight, metal; dispersions containing 10 to 15%, by weight, resin contain up to 13%, by weight metal; dispersions containing 15 to 20%, by weight, resin contain up to 12%, by weight metal; dispersions containing 20 to 25%, by weight, resin contain up to 11%, by weight, metal; dispersions containing 25 to 30%, by weight, resin contain up to 10%, by weight, metal; dispersions containing 30 to 35%, by weight, resin contain up to 9%, by weight, metal; dispersions containing 35 to 40%, by weight, resin contain up to 7.5%, by weight, metal; and dispersions containing 40 to 45%, by weight, metal contain up to 3.8% by weight metal and with the further proviso that when the metal is aluminum the percent by weight, of aluminum is up to one-third of said amounts of metal.

The particulate metal preferably has a bulking value of 0.048 gal./lb. for aluminum and 0.015 gal./lb. for gold bronze, gold or copper.

The bulking value or apparent density and viscosity of the resin solution can be used to define the critical limits of the proportions of particulate metal, solvent, and resin, which produces the "flemish" or "antique" appearance on a predominately smooth, nonporous substrate. For example, 100 volumes of a 2.5%, by weight of resin/hydrocarbon solution having a viscosity of 1.4 centipoise at 25° C. can be mixed with up to 17 volumes of particulate metal. The percentage, by weight, of the particulate metal in the mixture is dependent upon the apparent density of the particulate metal used. At the other end of the scale, up to 3.8 volumes of particulate metal can be added to 100 volumes of 50%, by weight, resin solution having a viscosity of 44 centipoise at 25° C. This relationship is further illustrated in the table below where the left-hand column is the weight percent of resin in odorless mineral spirits, the middle column is the viscosity of the solution in centipoises at 25° C. and the right-hand column is the maximum volumes of particulate metal which can be added to 100 volumes of the corresponding resin in the left-hand column to give a dispersion of this invention. A straight line is obtained, when the volume maxima are plotted on a linear scale and viscosity in centipoises is plotted on a logarithmic scale of graph paper having linear and logarithmic scales.

| Resin weight, percent | Viscosity centipoise (25° C.) | Maximum metal apparent vol. per 100 vols. of resin solution |
| --- | --- | --- |
| 2.5 | 1.4 | 17.0 |
| 5.0 | 1.6 | 16.0 |
| 10.0 | 2.3 | 15.0 |
| 20.0 | 4.4 | 12.5 |
| 25.0 | 6.0 | 11.4 |
| 30.0 | 8.4 | 10.0 |
| 40.0 | 17.5 | 7.5 |
| 50.0 | 44.0 | 3.8 |

The formulations used in the practice of this invention are conveniently prepared by dissolving the desired amount of the organic resin or oleaginous binder as it is sometimes referred to in a suitable amount of solvent, following which the metal powder is dispersed in the resulting solution. Alternatively, and preferably, a mixture of the organic resin in solid, particulate form together with the metal powder can be formulated and held for subsequent addition to a liquid solvent. This latter embodiment provides a convenient form in which to market the product.

The formulations used in practicing the present invention conveniently can be applied by any one of several conventional techniques such as, for example, by brush, roller, pressure spray, dipping or in the form of an aerosol spray package. After the formulation is applied to the surface of the object any excess formulation is either shaken off or simply allowed to drain off and the object is allowed to stand for sufficient time to permit the formulation to dry, usually five to 20 minutes. The "flemished" or "antiqued" appearance develops immediately upon application of the formulation and it is not a function of the evaporation to deposit the metal particles.

The invention is further illustrated by the following examples.

EXAMPLE 1

In order to illustrate a specific and preferred embodiment of the invention, a dry mix is prepared by adding together and mixing 100 parts by weight of the thermoplastic hydrocarbon resin available commercially under the brand name, "Piccopale 100," and 35 parts by weight of a "gold" bronze powder available commercially under the brand name, "Venus Palegold Extra Brilliant Litho Grade 2500 D." The "Piccopale 100" has the properties hereinbefore recited. "Venus Palegold Extra Brilliant Litho Grade 2500 D" is a bronze powder described as "coarse" in fineness, with an average of 3.0 percent of the particles being retained on a 200 mesh sieve screen and an average of 25.0 percent of the particles being retained on a 325 mesh sieve screen. The powder has an average apparent density of from 14 to 16 grams per cubic inch, and an average bulking value of 0.015 gallon per pound.

Four ounces by weight of the foregoing dry mix are introduced into 16 fluid ounces of a conventional paint thinner. The resulting mixture is allowed to stand, with intermittent agitation, for a period of 2 hours, during which time the resinous binder in its entirety dissolves in the solvent. The resulting formation, consisting of gold-colored metal particles dispersed in a solution of the resinous binder in the solvent, is applied to plastic artificial flowers by means of a brush. The excess coating formulation is allowed to drain off, and the coated flowers are permitted to dry at room temperature. On inspection after drying, it is observed that the objects have been covered with a thin film of a gold-colored coating adhering firmly to their surfaces. The coating, which reflects the texture of the plastic flowers, gives to them a rich and aged or antique appearance. The flowers were coated with a film of the resin having the bronze metal predominately localized on hills and valleys of rough surface areas on the flowers is similar to "flemish" or "antique" flowers. This "flemish" or "antique" appearance is considerably different than the hammered metal surface appearance which can be achieved by a spattering process with metal containing dispersions containing large quantities of dark or black pigments.

EXAMPLE 2

To 14 parts, by weight, of the hydrocarbon resin described in Example 1 was added 42 parts, by weight, of odorless mineral spirits and the mixture was agitated about 15 minutes to form a solution. Gold bronze powder, 3.7 parts and 0.3 part of a red pigment was added to the solution with agitation to form a dispersion.

Sixty parts of the dispersion was combined with 40 parts of difluorochloromethane and packaged in an aerosol container having a nozzled outlet valve. Plastic flowers were sprayed by first shaking the aerosol container containing the solution, holding the nozzle 6 to 8 inches from the flower and opening the valve. The flowers upon drying were coated with the resin. The metallic powder had collected predominately on the edges of the flowers to give a "flemish" appearance.

The following examples were prepared using the same resin described in Example 1 in odorless mineral spirits with the powdered metal indicated according to the procedure of Example 2. The use of the compositions of Examples 3–15 gave results when coated on a predominately smooth substrate similar to that obtained in Example 2.

| Ingredients (percent by weight) | Examples | | | | | | | | | | | | |
|---|---|---|---|---|---|---|---|---|---|---|---|---|---|
| | 3 | 4 | 5 | 6 | 7 | 8 | 9 | 10 | 11 | 12 | 13 | 14 | 15 |
| Hydrocarbon resin | 24.0 | 23.6 | 24.0 | 25.0 | 24.5 | 17.5 | 10.0 | 10.0 | 10.0 | 5.0 | 5.0 | 14.4 | 14 |
| Hydrocarbon solvent | 72.0 | 72.1 | 72.0 | 73.7 | 72.0 | 77.0 | 80.0 | 80.0 | 87.0 | 91.0 | 93.7 | 81.1 | 84.5 |
| Bronze powder | | 4.0 | | | | | | 10.0 | | 4.0 | | | |
| Aluminum powder | | | | 1.3 | | | | | 3.0 | | 1.3 | | 1.5 |
| Gold powder | 4.0 | | | | 3.5 | 5.0 | 9.5 | | | | | 4.5 | |
| Copper powder | | | 4.0 | | | | | | | | | | |
| Red iron oxide pigment | | | | | | | 0.5 | | | | | | |
| Burnt umber pigment | | 0.3 | | | | 0.5 | | | | | | | |

The resins used in the dispersions of this invention can contain some ethylenic unsaturation. When these unsaturated resins are used "air-drying" involving crosslinking of the resin molecules through this unsaturation can occur.

This crosslinking can be facilitated by means of a small amount such as 0.01 to 1.0%, by weight, of a catalyst such as cobalt compounds like cobalt naphthenoated added to the dispersion.

Referring to the drawing, the relationship between the area below Curve 1 represents the amount of the resin and powder metal in the formulation which gives this unusual effect to Curve 1 except that when the metal powder is aluminum one-third of the quantity of metal Curve 2 is used. Formulations having more resin and more metal powder as depicted in the area above Curve 1 do not give the unusual effect herein described but give a continuous metallized finish when coated on a nonporous substrate. The formulations above Curve 1 are paints as contrasted to my formulation. My formulation comprises:

(a) 0.5 to 45%, by weight, of an organic resin;
(b) 0.1–16%, by weight, of a particulate metal;
(c) 0 to 10%, by weight, of a coloring agent comprising a dye or pigment; and
(d) 29 to 99.4%, by weight, of an organic solvent or a mixture thereof; wherein the dispersions containing 0.5 to 5%, by weight, of resin contain up to 16%, by weight, metal; dispersions containing 5.1 to 10%, by weight, resin contain up to 15%, by weight, metal; dispersions containing 10.1 to 15%, by weight, resin contain up to 13%, by weight, metal; dispersions containing 15.1 to 20%, by weight, resin containing up to 12%, by weight, metal; dispersions containing 20.1 to 25%, by weight, resin contain up to 11%, by weight, metal; dispersions containing 25.1 to 30%, by weight, resin contain up to 10%, by weight, metal; dispersions containing 30.1 to 35%, by weight, resin contain up to 9%, by weight, metal; dispersions containing 35.1 to 40%, by weight, resin contain up to 7.5%, by weight, metal; and dispersions containing 40.1 to 45%, by weight, resin contain up to 3.8%, by weight metal and with the further proviso that when the metal is aluminum the percent, by weight, of aluminum is up to one-third of said amounts of metal.

The coated objects of this invention including plastic artificial flowers, centerpieces, displays, dried plants, paneling are useful as decorative objects and covering materials. The coating high lights these objects and can eliminate a harsh appearance of many of these objects.

The foregoing detailed description has been given for clarity of understanding only and no unnecessary limitations are to be understood therefrom. The invention is not limited to the exact details shown and described for obvious modifications will occur to those skilled in the art.

I claim:

1. Method for imparting an antiqued appearance to a non-porous substrate selected from the group consisting of polyethylene, polypropylene, polystyrene, polyvinyl chloride, glass and porcelain, which consists:

(a) applying to the surface of the substrate a mixture which consists of, (1) 20.1 to 25.0%, by weight, of a binder consisting of a petroleum hydrocarbon resin formed essentially from dienes and reactive olefins, said hydrocarbon resin being further characterized in that it is derived from the deep cracking of petroleum and has a melting point of approximately 100° C., a specific gravity at 25° C. of 0.96 to 0.98, a refractive index at 20° C. of 1.53, an acid number less than 1.0, an iodine value (Wijs) of 145, a bromine number of 36 and a molecular weight of approximately 1400;

(2) 0.1 to 11%, by weight, of a particulate metal selected from the group consisting of aluminum, gold bronze, copper, gold, silver and mixtures thereof; and (3) 64 to 79.8% of a hydrocarbon organic solvent having a relative evaporation rate compared to toluene of 0.03 to 6.0, mixtures thereof or a mixture thereof with, at least 50%, by weight, of a fluorocarbon or a hydrocarbon propellant.

References Cited

UNITED STATES PATENTS

| | | | |
|---|---|---|---|
| 2,151,312 | 3/1939 | Ariotti | 106—193 M |
| 2,328,001 | 8/1943 | Ariotti et al. | 106—193 M |
| 2,572,252 | 10/1951 | Erasmus et al. | 106—241 |
| 2,736,665 | 2/1956 | Rogers | 106—198 |

MORRIS LIEBMAN, Primary Examiner

P. R. MICHL, Assistant Examiner

U.S. Cl. X.R.

106—1; 117—37 R, 160 R